No. 684,354. Patented Oct. 8, 1901.
H. B. DIERDORFF.
MINING MACHINE.
(Application filed June 27, 1891.)
(No Model.) 7 Sheets—Sheet I.

Witnesses.
Nelson G. Thompson
M. B. May

Inventor.
Henry B. Dierdorff
by Doubleday & Bliss
attys

No. 684,354. Patented Oct. 8, 1901.
H. B. DIERDORFF.
MINING MACHINE.
(Application filed June 27, 1891.)
(No Model.) 7 Sheets—Sheet 2.
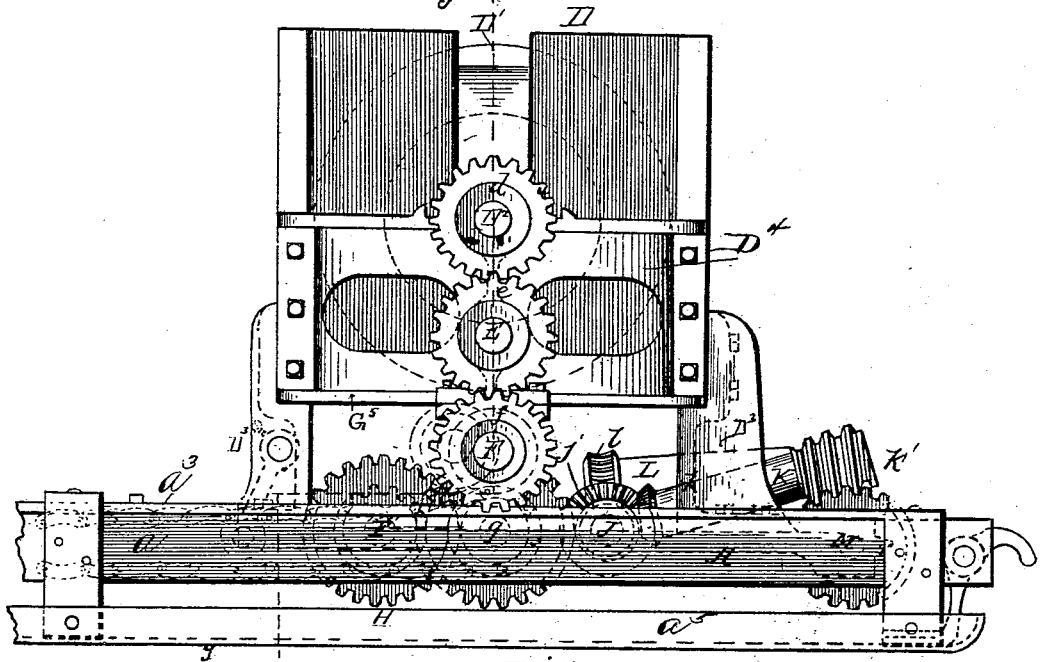
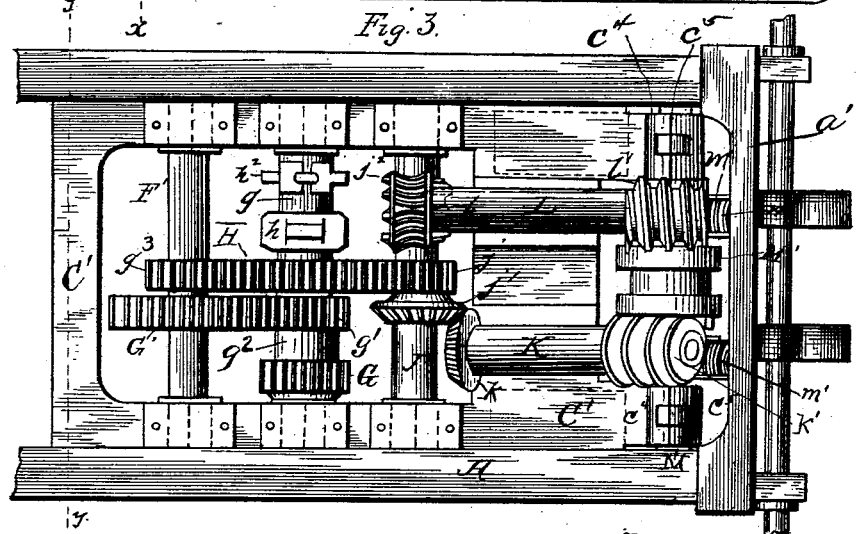
Witnesses: Inventor
Nelson Thompson. Henry B. Dierdorff
Marcus L. Byng. by Doubleday & Elias attys No. 684,354. Patented Oct. 8, 1901.
H. B. DIERDORFF.
MINING MACHINE.
(Application filed June 27, 1891.)

(No Model.) 7 Sheets—Sheet 3.

No. 684,354. Patented Oct. 8, 1901.
H. B. DIERDORFF.
MINING MACHINE.
(Application filed June 27, 1891.)

(No Model.) 7 Sheets—Sheet 4.

Witnesses. Inventor.
Nelson Thompson Henry B. Dierdorff
M. Bellay. by Doubleday & Bliss
atty

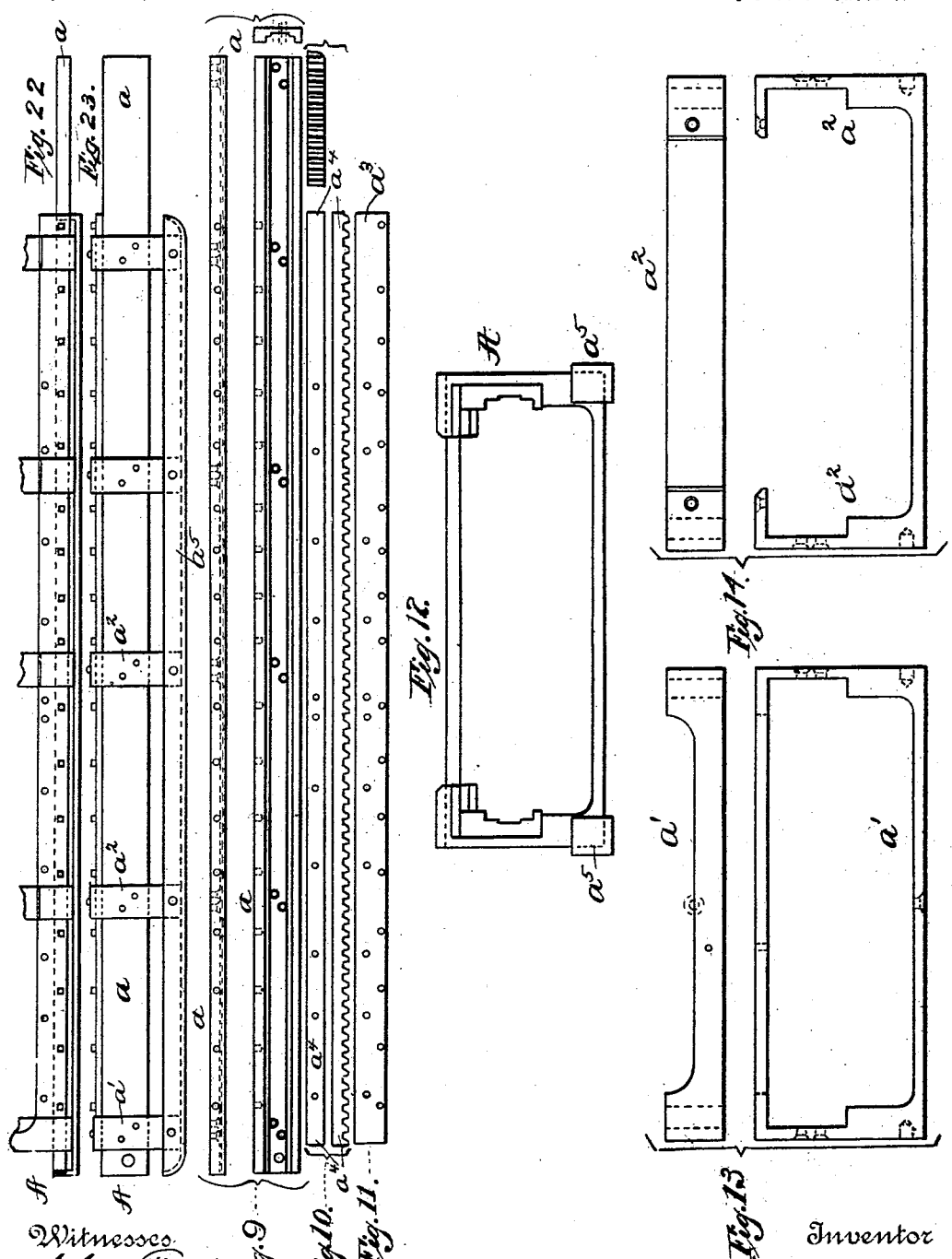

No. 684,354. Patented Oct. 8, 1901.
H. B. DIERDORFF.
MINING MACHINE.
(Application filed June 27, 1891.)
(No Model.) 7 Sheets—Sheet 6.
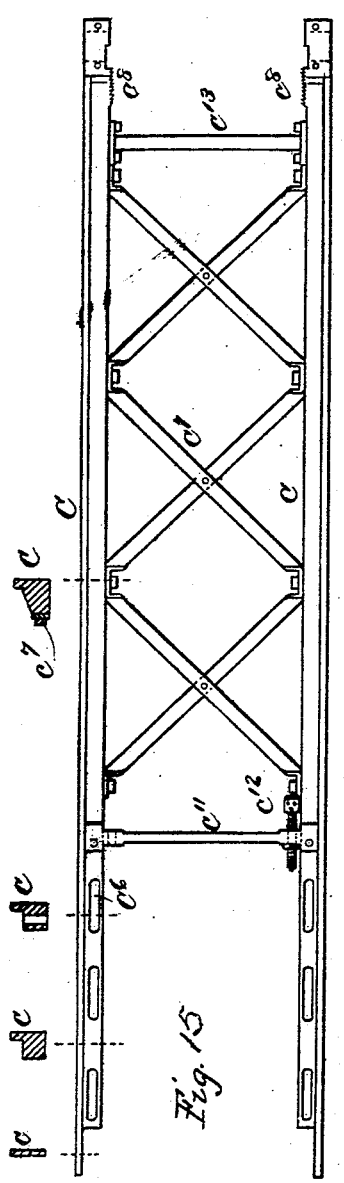
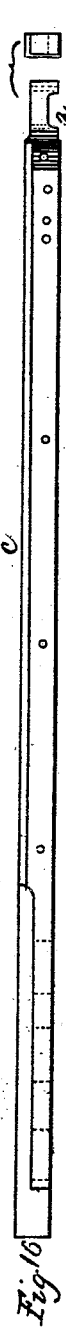
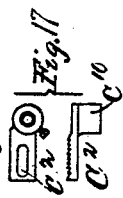
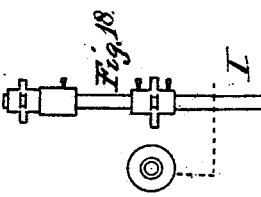
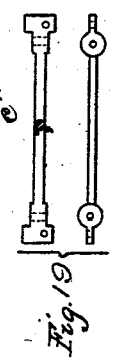
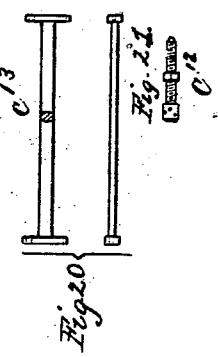
Witnesses
Nelson Thompson
M. B. May
Inventor
Henry B. Dierdorff
by Doubleday & Bliss
Attorneys No. 684,354. Patented Oct. 8, 1901.
H. B. DIERDORFF.
MINING MACHINE.
(Application filed June 27, 1891.)
(No Model.) 7 Sheets—Sheet 7.
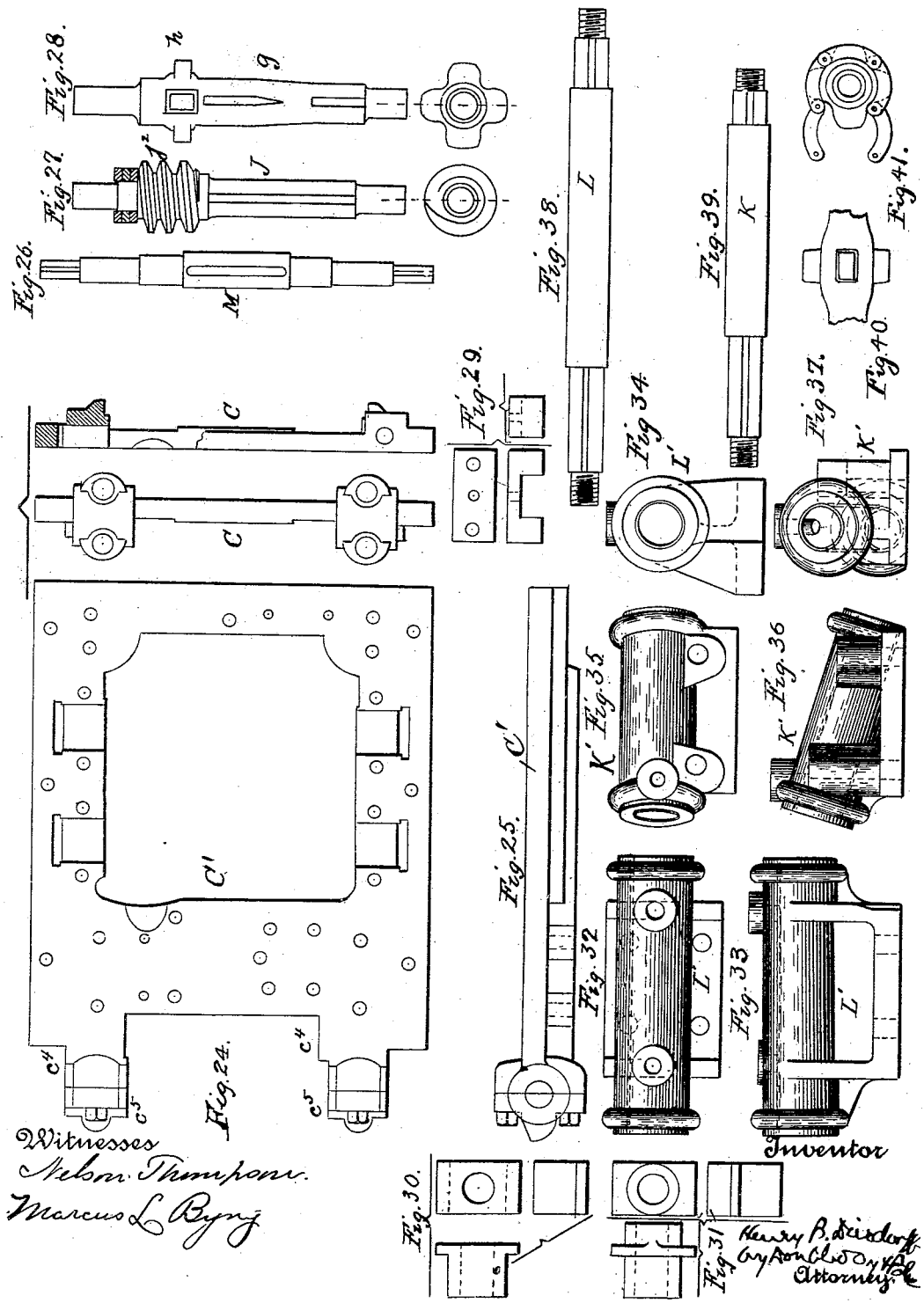

UNITED STATES PATENT OFFICE.

HENRY B. DIERDORFF, OF COLUMBUS, OHIO, ASSIGNOR TO JOSEPH A. JEFFREY, OF SAME PLACE.

MINING-MACHINE.

SPECIFICATION forming part of Letters Patent No. 684,354, dated October 8, 1901.

Application filed June 27, 1891. Serial No. 397,712. (No model.)

*To all whom it may concern:*

Be it known that I, HENRY B. DIERDORFF, a citizen of the United States, residing at Columbus, in the county of Franklin and State of Ohio, have invented certain new and useful Improvements in Mining-Machines, of which the following is a specification, reference being had therein to the accompanying drawings.

This invention relates to new and useful improvements in mining-machines, the object being to provide a more compact, efficient, and durable arrangement of the power devices and power-transmitting mechanism than have been provided in such machines as heretofore constructed.

Figure 1:
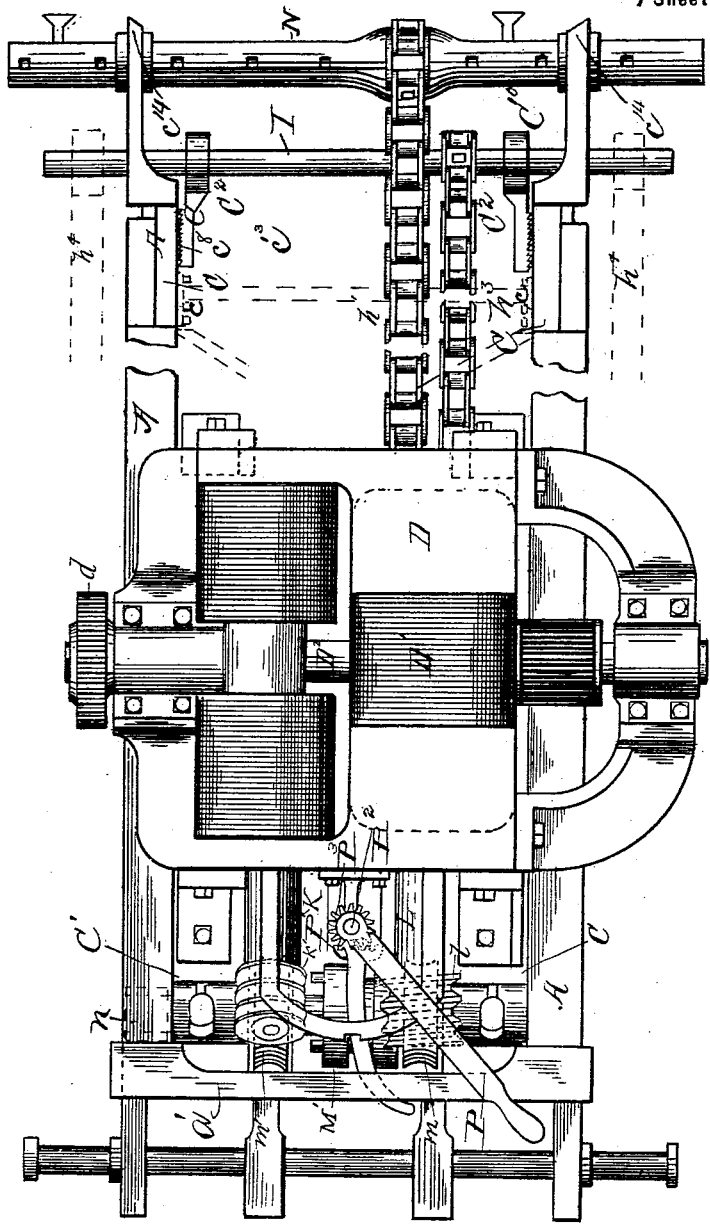
Figure 4:
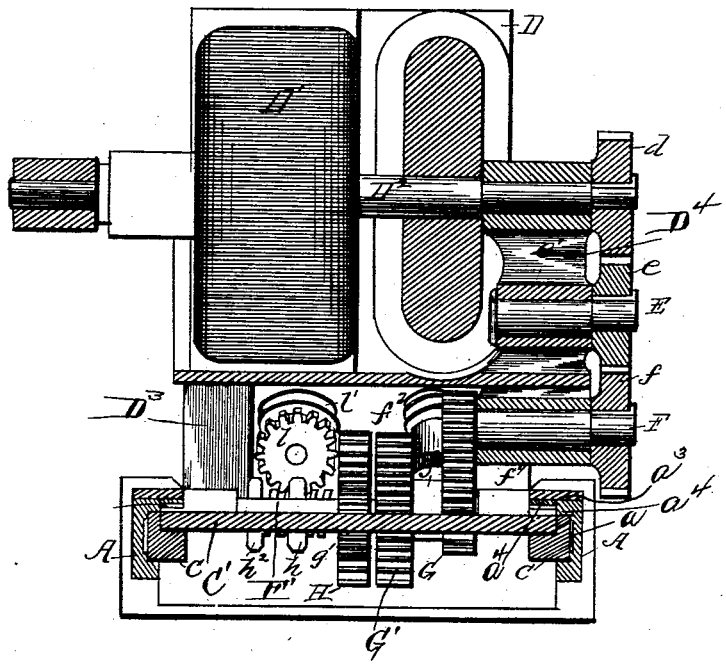
Figure 5:
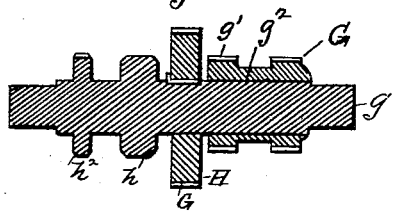
Figure 6:
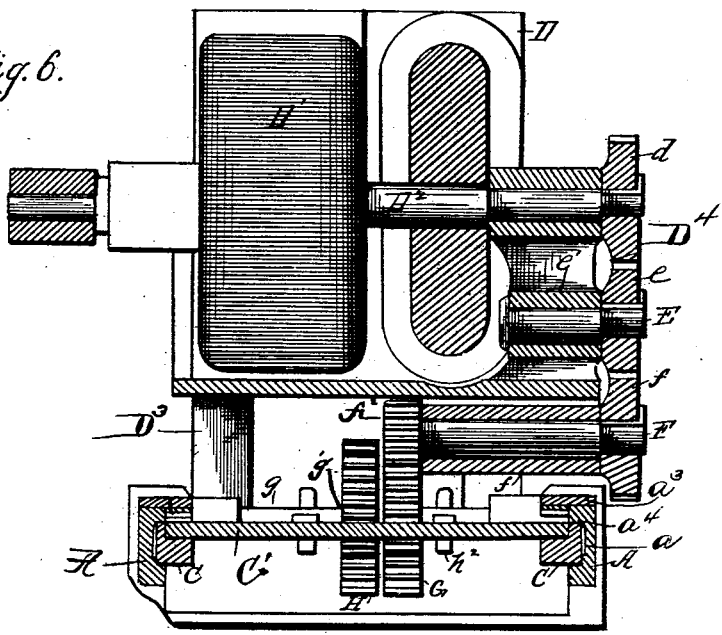
Figure 7:
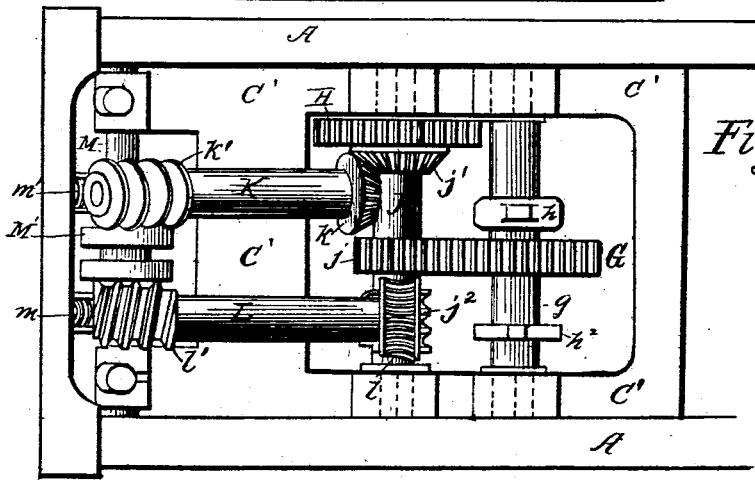
Figure 8:
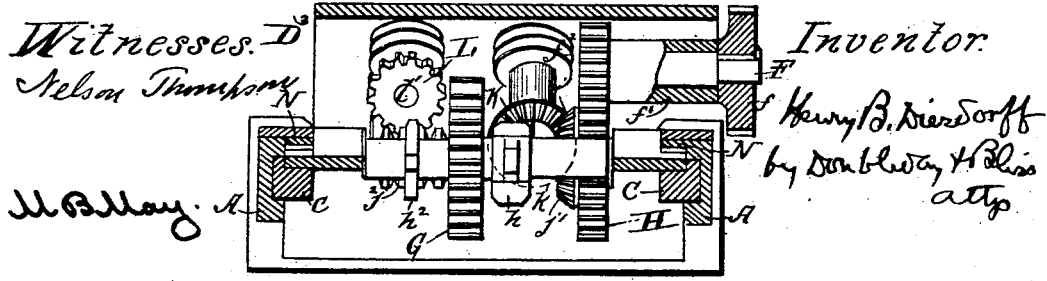

In the drawings, Figure 1 is a plan view of one form of machine containing my improvements. Fig. 2 is a side elevation. Fig. 3 is a plan view with the motor removed, showing the gearing. Fig. 3$^a$ shows the forward part of the bed-frame and the cleaner-chain. Fig. 4 is a cross-section on line $x$ $x$, Fig. 2. Fig. 5 is a section through the chain-driving shaft. Fig. 6 is a cross-section of a machine slightly modified as to its gearing. Fig. 7 is a plan view of another modified form. Fig. 8 is a front view, partly in section, of the machine in Fig. 7. Figs. 9, 10, and 11 show the side bars of the bed and the rack-bars. Figs. 12, 13, and 14 show the cross-girths for the main frame. Figs. 15 and 16 show the carriage for the cutter-bar. Fig. 17 shows the bracket for the cleaning-chain shaft. Fig. 18 shows the cleaning-chain shaft. Fig. 19 shows the bar which holds the carriage-adjusting screws. Fig. 20 shows the front cross-bar of the carriage. Fig. 21 shows one of the carriage-adjusting screws. Fig. 22 is a plan view, and Fig. 23 a side view, of one of the side parts of the bed-frame. Fig. 24 includes a plan view, a rear view, and a front view, partly in section, of the carriage-plate shown in Figs. 7 and 8. Fig. 25 is a side view of the carriage-plate. Figs. 26, 27, and 28 show some of the shafts. Figs. 29, 30, and 31 show details of construction. Figs. 32 to 39 show in detail the feed and pull-back shafts and the bracket-bearings therefor. Figs. 40 and 41 are a plan of part of the cutter-bar and an end view thereof.

In the drawings I have shown a bed or frame adapted to be made stationary by means of jack-screws or otherwise when the machine is in use, it having side bars A A, with rear cross-girth $a'$ and front girths $a^2$ $a^2$. The side bars A A as a whole are composed of flat bars $a$, top strips or bars $a^3$, and rack-bars $a^4$, secured to the under side of strips or bars $a^3$, as will be seen by examining Figs. 13 to 19. The bed-frame is supported upon runners $a^5$. In this bed-frame slides a carriage-frame having forwardly-projecting bars C C, connected by braces $c^7$, $c^{11}$, and $c^{13}$ and which slide in the grooves formed in the side bed-bars. Upon the rear end of the carriage-bars is secured a bed-plate C′ by means of bolts passed through the elongated slots in the said bars. The carriage is adjusted by means of screws $c^{12}$, passing through cross-girth $c^{11}$ and bearing against the front part of the carriage bed-plate C′. (See Fig. 17.) In shoes $c^{14}$ in the end of the carriage-bars is mounted the cutter-bar N, having cutters constructed to form a kerf in the face of the coal. On the inner side of the carriage-bars, near the end, are ratchet-teeth C$^8$, adapted to engage similar teeth on the brackets C$^2$, which have elongated slots for permitting their adjustments on the carriage-bars and bearings C$^{10}$ for the cleaner-chain shaft I.

The carriage bed-plate C′ has mounted upon it an electric motor D, with the usual armature D′ and commutator, said motor being mounted on standards D$^3$ D$^3$, high enough so as not to interfere with the action of the gearing underneath. On the armature-shaft D$^2$ is keyed a pinion $d$, engaging a pinion $e$, rigid with a stud-shaft E, journaled in bearing $e'$, formed in a bracket D$^4$. Power is carried from pinion $e$ to chain-driving shaft $g$ by means of pinion $f$, keyed to shaft F, mounted in an elongated bearing $f'$, wheel $f^2$ on shaft F, pinion G on a sleeve $g^2$, to which is keyed wheel $g'$, wheel G′ on shaft F′, pinion $g^3$, and wheel H, meshing therewith and keyed to shaft $g$. Thus it will be seen that the "slowing-down" gearing takes up but very small space and is compactly arranged. The shafts F′ and $g$ are mounted in bearings formed on the carriage bed-plate C′. Power is applied to the cutter-bar N through chain $h'$, driven by sprocket-wheel $h$ on chain-driving shaft $g$. Chain $h^3$, driven by sprocket-wheel $h^2$, drives the cleaner-chain shaft I, (as aforesaid mounted in bracket $C^3$.) The cleaner-chains $h^4$ $h^4$, driven by wheels mounted on the outer ends of shaft I, act to withdraw the cuttings from the kerf, being assisted in this operation by the chain $h^3$. The said chains $h^4$ $h^4$ at their rear ends are supported on sprocket-wheels $I^4$, which are mounted in brackets $I^2$, pivoted to stud-shafts $I^3$. The aforesaid wheel H transmits to devices behind it the power for effecting the movements of the carriage. These devices consist of a shaft J, driven by said wheel H through pinion $j$ and actuating in either direction by means of shafts K and L and connecting gearing the shaft M, which carries pinions engaging the rack-bars $a^4$ on the bed. The shaft J has worm $j^2$, meshing with worm-wheel $l$, pinion $j$, as said, meshing with wheel H and bevel-wheel $j'$ meshing with bevel-wheel $k$. The shaft L is mounted in an elongated and inclined bearing L', (see Figs. 32 and 33 of drawings,) having on one end worm-wheel $l$ and on the other end worm $l'$, the latter engaging with a worm-wheel $m$, mounted on the aforesaid shaft M. The shaft K is mounted in the bearing K' and carries bevel-wheel $k$ and worm $k'$, meshing with worm-wheel $m'$. The shaft M, upon which the worm-wheels $m$ and $m'$ are loosely mounted, is mounted in bearings $c^4$ $c^5$ on the plate C', and M' is a clutch keyed to shaft M and moved longitudinally of said shaft by means of a lever P, vertical shaft $P^2$, pinion $P^3$, and rack P', which rack carries a pin engaging said clutch. It will be readily seen that when the clutch M' is engaging worm-wheel $m$, that power being transmitted to pinions $n$, the carriage will be driven forward at a slow rate of speed, while it will be returned or retracted rapidly when the clutch is shifted and the shaft M is revolved in the opposite direction through the medium of shaft K and its coacting gearing.

In Fig. 6 is shown a machine similar to that just described in regard to the cutting apparatus, carriage feed, and retracting mechanism, but different in respect to the slowing-down gearing. In this figure it will be seen that wheels $d$ $e$ $f$ are arranged as in Fig. 4; but the shaft F is elongated, extending nearer to the central line of the machine and gearing directly with wheel G on chain-shaft $g$. Power is imparted to this shaft by means of pinion $g'$ and wheel H', thereby dispensing with the tubular shaft $g^2$ or sleeve carrying two pinions.

In Figs. 7 and 8 another arrangement of gearing is shown, in which power is applied to the shaft J directly from pinion $f$ through the medium of shaft F, wheel $f^2$, and wheel H. The chain-shaft $g$ is actuated by pinion $j$ and wheel G.

With a construction like that shown in Fig. 6 the bottom shafting can be substantially as shown in Figs. 2 and 3, except that the hollow shaft $g^2$ is dispensed with and the pinion $f^2$ can engage directly with the wheel G'. In a construction like that shown in Figs. 7 and 8 (in which the power is taken down from the armature-shaft through a train of wheels $d$ $e$ $f$ similar to those in Figs. 2 and 4) one of the shafts at the bottom can be dispensed with. The carriage-plate C' (shown in Fig. 24) can be used in a construction like that in Figs. 7 and 8, and to adapt a substantially similar plate for use in the machine shown in Fig. 3 it is merely necessary to elongate it slightly and provide it with another pair of shaft-boxes.

It will be seen that in the main respects all of the forms of machine shown are similar in that the parts are all compactly arranged and so disposed as to apply with the utmost efficiency the power from the motor. In each case the power is taken to what may be called a "gearing chamber or space" below the motor, the armature-pinion being geared to an intermediate transversely-arranged shaft, which extends into the said gearing chamber or space under the motor and there imparts power to the driven parts. This enables me to utilize the entire width of the machine, it being desirable to apply a comparatively large motor and at the same time have a relatively narrow frame and carriage. By placing the chain-shaft and other parts described directly beneath the motor the machine can be shortened up. It is well known that although it is desirable to produce a cut under the coal to a distance to five or six feet it is also in many places essential that the machine should not extend back from the face of the coal more than a very short distance, as it is necessary to place posts under the roof to prevent it from falling. By placing the motor or the front part thereof directly over the chain-shaft I can carry it and the gearing close up to the face of the coal and at the same time make the bed-frame relatively shorter, so that the machine can be readily manipulated even when the roof-posts are brought up close to the face.

In order to prevent the chain from interfering with the motor or the parts above it in case it should be broken while the machine is in motion, I employ a guard $G^5$. It is placed in such proximity to the chain-wheel $h$ that the links of the chain are successively compelled to slide outward even if the chain be broken and they are prevented from being piled up beneath the motor. Heretofore in case of a breakage of the chain the links have tended to warp around or become entangled with the chain-shafts, and as a high power is being imparted to the machine at such time the broken chain acts to press upward and break the machine. A guard of the character described effectually prevents this.

Each of the machines shown, it will be seen, has the chain-driving shaft and the feed-shaft mounted relatively low, together with an intermediate shaft, as at J, in or nearly in the horizontal plane of the feed and chain shafts, and two independent trains of gearing connecting the intermediate shaft with the feed-shaft, the latter being reversible, as above described. It is desirable to have the chain-shaft and the feed-shaft as nearly as possible in the plane of the cutting apparatus, so that the rotating of the cutters and their forward feeding can be effected by power applied on the horizontal lines of the bar.

By placing the armature-shaft transversely of the machine, as above described, and employing straight spur-gearing arranged over or to overhang the bed I can connect the armature with the cutting apparatus without the necessity of either bevel or worm gear, both of which are destructive of power, as is well known; but as concerns the arrangement of the gearing with respect to the motor there can be modification of the position of the armature-shaft and the secondary or intermediate shaft so long as the latter extends inwardly under the motor or to a point where it is geared to parts lying below it. I herein refer to this secondary or intermediate shaft F as being directly below the armature-shaft, meaning that it is not arranged as in those machines in which it has been placed transversely across the carriage and in front of the motor. I believe myself to have been the first to have devised an arrangement of the parts whereby this intermediate or secondary shaft can be rotated by straight spur-gearing and be situated on such lines that it extends toward or into the space directly under the motor. It may be carried to one point or another, according to the style of the gearing used, as will be seen on a comparison of Fig. 4 with Fig. 6 or Fig. 9. In my application, Serial No. 501,584, filed February 26, 1894, I have shown a similar arrangement, broadly considered, of the motor and gearing when used to drive a cutting apparatus in which the chain itself is provided with cutters. I do not herein claim any of the specific features relating to that construction of cutting apparatus, having presented claims in said other application therefor and preferring herein to claim the novel matters which are incident to both forms of the machine in common, they being alike as concerns the essential parts of the present improvements and differing in having vertically-moving cutters actuated by the chain in the present case and horizontally-moving cutters actuated by the chain in the other construction. I present in this application claims for the novel features of construction and peculiar arrangement of parts disclosed in Figs. 1 to 8 only, and in another application, Serial No. 569,484, filed on the 20th day of November, 1895, as a division of the present case, I illustrate and describe another form of the machine and therein present claims for the novel features incident to the form therein and to those herein relating to the arrangement of the motor, the gearing, the cutting apparatus, and the carriage-moving mechanism and do not herein claim any of the matters claimed in said divisional application.

What I claim is—

1. The combination of the bed, the carriage, the cutting apparatus on the carriage, the chain which actuates the cutting apparatus, the shaft at the rear engaging with said chain, the loose wheel on the chain-driving shaft, a shaft supplemental to the said chain-driving shaft, the gearing connecting the said loose wheel with said supplemental shaft, and gearing connecting the latter with the chain-driving shaft, substantially as set forth.

2. The combination of the bed, the carriage, the cutting apparatus on the carriage, the chain-shaft, the chain connecting said shaft with the cutting apparatus, a relatively large wheel connected to the said chain-shaft, a relatively small wheel driving the aforesaid wheel, a shaft for the said small wheel, mounted on the carriage in substantially the same horizontal plane as the chain-shaft, a relatively large wheel also on the last said shaft, a relatively smaller wheel engaging with the last said larger wheel, an electric motor mounted above the said gearing, and having its armature connected to the last aforesaid relatively small wheel substantially as described whereby substantially the armature-speed is imparted to the said wheel, as set forth.

3. The combination of the bed, the carriage, the cutting apparatus, the chain, the chain-driving shaft, the shaft supplemental thereto and in substantially the same horizontal plane, a relatively small wheel on the last said shaft, the relatively larger wheel engaging therewith on the chain-shaft, the relatively larger wheel on said supplemental shaft, the relatively small wheel engaging with the last said larger wheel, the electric motor above the said gearing, mechanism substantially as described which imparts to the aforesaid smaller wheel substantially the speed of the armature-shaft, a third shaft on the carriage parallel to and in the same horizontal plane with the two aforesaid shafts, mechanism for moving the carriage in the bed actuated by the said third shaft and means substantially as described for connecting the last said shaft with one of those on the carriage as aforesaid, as set forth.

4. The combination of the bed, the carriage, the cutting apparatus on the carriage, the chain-driving shaft, the carriage-moving shaft, a power-shaft, a shaft intermediate between the power-shaft and the chain-shaft and a shaft intermediate between the chain-shaft and the carriage-moving shaft, and said shafts being mounted in substantially the same horizontal plane, and an electric motor mounted over and above the said shafts and geared to the power-shaft.

5. The combination in a front-thrust undercutting mining-machine, of the bed, the carriage sliding forward and back thereon, the cutting apparatus arranged to act at the front of the carriage, the electric motor extending laterally substantially from side to side of the said carriage, the shafting and gearing below and underneath the motor which drives the cutting apparatus, the tubular power-shaft loosely mounted on one of the said cutter-driving shafts, below the motor and connecting the motor-gearing with the gearing which drives the cutting apparatus, substantially as set forth.

6. The combination of the bed, the carriage, the cutting apparatus on the carriage, the chain which actuates the cutting apparatus, the chain-driving shaft, the motor, a supplemental shaft, F', gearing for moving the carriage longitudinally of the bed, a shaft, J, for driving the last said gearing, slowing-down gearing connecting the motor-armature with the supplemental shaft, F', and a gear mounted on the chain-driving shaft and meshing with pinions on both the shafts, F', J, substantially as set forth.

7. The combination of the bed having longitudinally-extending racks secured thereto, the carriage, the motor on the carriage, the pinion-shaft on the carriage, the pinions on the pinion-shaft and meshing with the racks on the bed, the shafts, K, L, for driving said pinion-shaft in opposite directions, the clutch for connecting either of said shafts to the pinion-shaft, the shaft, J, geared to both the last said shafts, K, L, the cutting apparatus on the carriage, the chain which actuates said cutting apparatus, the shaft, g, adapted to drive both the said chain and the aforesaid shaft, J, and gearing connecting the said chain-driving shaft with the motor, substantially as set forth.

In testimony whereof I affix my signature in presence of two witnesses.

HENRY B. DIERDORFF.

Witnesses:
SAML. R. MOUNTAIN,
CHAS. W. MILLER.